United States Patent
Yang et al.

(10) Patent No.: US 10,844,222 B2
(45) Date of Patent: Nov. 24, 2020

(54) SEMI-TRANSPARENT POLYMER COMPOSITE COMPRISING A LINEAR ALIPHATIC POLYAMIDE

(71) Applicants: Evonik Operations GmbH, Essen (DE); Evonik Specialty Chemicals (Shanghai) Co., Ltd., Shanghai (CN)

(72) Inventors: Jianmin Yang, Shanghai (CN); Urs Welz-Biermann, Shanghai (CN); Klaus Hülsmann, Haltern am See (DE); Fei Teng, Shanghai (CN); Juan Guo, Shanghai (CN); Chenyu Ye, Shanghai (CN); Zhisheng Wang, Shanghai (CN); Kathrin Salwiczek, Recklinghausen (DE)

(73) Assignees: Evonik Operations GmbH, Essen (DE); Evonik Specialty Chemicals (Shanghai) Co., Ltd., Shanghai (CN)

( * ) Notice: Subject to any disclaimer, the term of this patent is extended or adjusted under 35 U.S.C. 154(b) by 70 days.

(21) Appl. No.: 16/197,691

(22) Filed: Nov. 21, 2018

(65) Prior Publication Data

US 2019/0153221 A1 May 23, 2019

(30) Foreign Application Priority Data

Nov. 21, 2017 (WO) ............... PCT/CN2017/112078

(51) Int. Cl.
*C08L 77/02* (2006.01)
*C08L 77/06* (2006.01)

(52) U.S. Cl.
CPC ............... *C08L 77/02* (2013.01); *C08L 77/06* (2013.01); *C08L 2201/10* (2013.01); *C08L 2203/20* (2013.01); *C08L 2205/03* (2013.01); *C08L 2205/12* (2013.01); *C08L 2207/53* (2013.01)

(58) Field of Classification Search
CPC ...... C08L 77/02; C08L 77/06; C08L 2207/53; C08K 7/14
See application file for complete search history.

(56) References Cited

U.S. PATENT DOCUMENTS

| | | |
|---|---|---|
| 4,495,324 A | 1/1985 | Chacko et al. |
| 2009/0149600 A1 | 6/2009 | Ness |
| 2010/0160140 A1* | 6/2010 | McGinnis ............... C03C 3/085 501/38 |
| 2014/0066561 A1 | 3/2014 | Pfleghar et al. |

FOREIGN PATENT DOCUMENTS

EP  0 722 961  7/1996

* cited by examiner

*Primary Examiner* — Wenwen Cai
(74) *Attorney, Agent, or Firm* — Grüneberg and Myers PLLC

(57) ABSTRACT

A polymer composite includes a linear aliphatic semi-crystalline polyamide having on average 10 to 14 carbon atoms in the monomer units, or the compound thereof, an S glass fiber, and a core-shell impact modifier. The polymer composite can achieve higher stiffness and impact strength without impairing the transparency significantly. The polymer composite can be used as molding material.

11 Claims, No Drawings

SEMI-TRANSPARENT POLYMER COMPOSITE COMPRISING A LINEAR ALIPHATIC POLYAMIDE

This application is a continuation-in-part of International Application No. PCT/CN2017/112078, filed on Nov. 21, 2017, the entirety of which is incorporated herein by reference.

FIELD OF THE INVENTION

The present invention relates to the field of polymer composites. In particular the present invention relates to a semi-transparent polymer composite comprising linear aliphatic polyamide, an S glass fibre and a core-shell impact modifier.

BACKGROUND

Semi-transparent polyamides, e.g. those based on PA12, can be used to make sports shoe outsole and due to its transparency, the design pattern & colour of the midsole can be seen through the polymer outsole by human eyes.

For this application, it is sometimes desired to have higher stiffness and higher impact strength. For such a reason, glass fibres and impact modifiers are normally added to modify the polyamides. However, the transparency of the polyamides will normally be impaired, From the perspective of aesthetic, it is sometimes desired to keep the transparency when the polyamides are modified to improve the mechanical properties.

US2014066561 has disclosed polyamide moulding compounds consisting of thermoplastic synthetic, fibre-shaped aggregates, particulate filler material and additives, wherein the thermoplastic synthetic can be a polyamide mixture (e.g. aliphatic polyamide and impact modifiers), and the fibre-shaped aggregates can be high-strength glass fibres (e.g. S-1 and S-2 glass fibres from AGY). The transparency of the moulding compounds are not discussed in the disclosure.

SUMMARY OF THE INVENTION

One objective of the present invention is to improve both the stiffness and impact strength of semi-transparent polyamides without significantly lowering of the transparency of the polyamides. A further objective is a moulded article comprising the composition with high flexibility.

This objective of the present invention is achieved by a polymer composite comprising:
a) 60-97 wt % a linear aliphatic polyamide having on average 10 to 14 carbon atoms in the monomer units, or the compound thereof, wherein the polyamide is selected from semi-crystalline polyamides,
b) 2-30 wt % an S glass fibre, more preferably 2-20 wt %, most preferably 3.5-10 wt %, comprising: 60-66% $SiO_2$, 23-25% $Al_2O_3$, 6-11% MgO, 0-9% CaO, 0-0.2% $Na_2O$+ $K_2O$, and 0-0.1% $Fe_2O_3$, based on the total weight of the glass, and
c) 1-10 wt % a core-shell impact modifier which comprises the following:
  c1) a core which comprises 60 to 100 wt % of butadiene units and 0 to 40 wt % of styrene units, wherein the core makes up 60 to 95 wt % of the core-shell modifier; and
  c2) a shell which comprises 80 to 100 wt % of methyl methacrylate units and 0 to 20 wt % of modifying monomer units, wherein the shell makes up 5 to 40 wt % of the core-shell modifier, based on the total weight of the polymer composite.

Another objective of the present invention is to provide moulding material consisting of the polymer composite of the present invention.

A further objective of the present invention is to provide moulded articles produced from the moulding material of the present invention.

DETAILED DESCRIPTION OF THE INVENTION

The linear aliphatic semi-crystalline polyamide according to a) has on average from 10 to 14 carbon atoms in the individual monomer units. Said polyamide is producible from a combination of diamine and dicarboxylic acid, from an w-aminocarboxylic acid and/or the corresponding lactam. The monomer units in question are therefore the units which derive from lactam, ω-aminocarboxylic acid, diamine or dicarboxylic acid.

Suitable polyamides further include copolyamides which, on the basis of suitable comonomer selection, comply with the proviso that the monomer units comprise on average 10 to 14 carbon atoms, for example the copolyamide composed of laurolactam, decanediamine and dodecanedioic acid (co-PA12/1012).

It will be appreciated that the component according to a) employed may also be compounds of appropriate polyamides, sufficient mutual compatibility being advantageous.

Semi-crystalline polyamides of the invention have an enthalpy of fusion of 4 to 25 J/g, measured by the DSC method to ISO 11357 in the 2nd heating step with a heating rate of 10 K/min and integration of the melt peak. In contrast, amorphous polyamides have an enthalpy of fusion of less than 4 J/g, measured by the DSC method to ISO 11357 in the 2nd heating step and integration of the melt peak.

Preferably, the linear aliphatic polyamide according to a) has on average from 10 to 12 carbon atoms in the individual monomer units. The following polyamides are suitable by way of example:
  Average of 10 carbon atoms: PA10, PA1010, PA812, PA128, PA614, PA146
  Average of 11 carbon atoms: PA11, PA1012, PA1210, PA913, PA139, PA814, PA148, PA616
  Average of 12 carbon atoms: PA12, PA1212, PA1113, PA1014, PA1410, PA816, PA618

Preferably, the S glass fibre comprises 64-66% $SiO_2$, 24-25% $Al_2O_3$, 9.5-10% MgO, 0-0.2% CaO, 0-0.2% $Na_2O$+ $K_2O$, and 0-0.1% $Fe_2O_3$, based on the total weight of the glass.

More preferably, the S glass fibre does not comprise $B_2O_3$ and/or $TiO_2$. And particularly preferably, the S glass fibre does not comprise further oxides.

The core-shell modifier consists of particles having a weight-average diameter of 20 to 500 nm, preferably of 30 to 400 nm, particularly preferably of 40 to 350 nm and especially preferably of 50 to 300 nm. The core may be uncrosslinked; it is preferably crosslinked. The shell may be uncrosslinked or crosslinked. Crosslinking may be achieved during production by addition of a compound having two or more vinyl groups, for example divinylbenzene, ethylene glycol dimethylacrylate, trimethacrylates, triacrylates, allyl acrylate, allyl methacrylate, diallyl phthalate or triallyl isocyanurate. The shell may also have incorporated into it by polymerization further monomers having a functional group capable of reacting with polyamide, for example acrylic acid, glycidyl methacrylate, maleic anhydride or itaconic anhydride. Further modifying monomers which may be incorporated into the shell by polymerization are for example styrene, acrylonitrile, acrylamide or hydroxyethyl methacrylate.

In addition to the core and the shell the core-shell modifier may also comprise one or more intermediate shells if this is advantageous for achieving certain properties.

The production of such core-shell modifiers is described in EP0722961A1 or US2009/0149600 for example. Suitable types are commercially available.

Preferably, the core c1) does not comprise any styrene units.

In order to impair the transparency of the polymer composite/moulding material to the smallest possible extent, it is preferable that:

the difference in the refractive indices between the polyamide component according to a) and the S glass fibre according to b) at room temperature is less than 0.01, and/or the difference in the refractive indices between the polyamide component according to a) and the core-shell modifier according to c) at room temperature is less than 0.01, measured according to DIN EN ISO 489:1999 by method A.

These refractive indices are determined to DIN EN ISO 489:1999 by method A (Zeiss Abbe model A instrument, Schott KL 150 B lamp, white cold light source). However, for a particle size in the lower range, for instance below 200 nm and in particular below 160 nm, a high transparency is retained even at a relatively high difference in the refractive indices.

Preferably, the polyamide is transparent with a haze not greater than 60%, more preferably not greater than 50%, measured according to ASTM D1003 on injection moulded test specimens of 3 mm in thickness.

The polymer composite according to the invention may comprise as constituents, in addition to the components according to a), b) and c), further customary added substances preferably chosen such that they impair transparency only to the smallest possible extent if at all, for example flame retardants, stabilizers, plasticizers, fillers, nanoparticles, antistats, dyes, pigments, mould-release agents, glass fibers or flow assistants, with an total amount not greater than 10 wt %, preferably not greater than 5 wt % based on the total weight of the polymer composite.

Preferably, the polymer according to the invention consists of the above specified constituents.

The polymer composite may be produced by melt mixing on suitable kneaders or compounding machines, discharging and comminution. A multiphase system is concerned here where the modifier is present in the polyimide matrix in finely disperse form. The melt mixing is effected according to the prior art in a kneading assembly, discharge generally in the form of a strand/extrudate and comminution generally by pelletizing, crushing or grinding.

The polymer composite is preferably a moulding composition and can be used as moulding material.

The moulding material can be processed into moulded articles by melting and moulding by processes known to those skilled in the art such as injection moulding, extrusion, pressing or rolling.

The moulded articles can be in used in one of the following sectors: electrical equipment, sports items, optical equipment, sanitary and hygiene items, household equipment, communications technology, automobile technology, energy and drive technology, mechanical engineering, medical equipment.

The invention is elucidated by way of example hereinbelow.

EXAMPLES

The following materials were employed in the reference, the examples (E1 to E3) and the comparative examples (CE1 to CE6):

Polyamide 1: VESTAMID LX9012, a semi-crystalline PA12 moulding composition, commercially available from Evonik Resource Efficiency GmbH;

Polyamide 2: TROGAMID CX9704 nc, an amorphous PA PACM12 produced from bis(4-aminocyclohexyl) methane and dodecanedioic acid, commercially available from Evonik Resource Efficiency GmbH;

CS7974: E-glass fibre, commercially available from Lanxess;

ECS301 HP: E-glass fibre, commercially available from CPIC;

AGY 544: a S-2 glass fibre with the following composition 64-66% $SiO_2$, 24-25% $Al_2O_3$, 0-0.2% CaO, 9.5-10% MgO, 0-0.2% $Na_2O+K_{20}$ and 0-0.1% $Fe_2O_3$, commercially available from AGY;

Exxelor VA1803: an impact modifier of a maleic-anhydride-grafted ethylene/propylene rubber, commercially available from Exxon Mobil;

Paraloid EXL-2690: an impact modifier of a core-shell copolymer, shown by analysis to consist to an extent of about 80 wt % of a core in which only units of butadiene and no styrene units are detectable and to an extent of about 20 wt % of a shell constructed essentially from methyl methacrylate units, commercially available from Dow.

Melt mixtures were produced on a Coperion ZSK-26mc co-rotating twin screw extruder, discharged, pelletized to obtain the polymer composites according to the recipe indicated in Table 1, wherein the polyamides and impact modifier were dry blended and fed into the main port of extruder and then mixed at 250° C., and the glass fibers were fed via a side feeder into the extruder.

The polymer composites in pellet form were processed on an injection moulding machine Engel VC 650/200 (melt temperature 240° C.; mould temperature 60° C.) to prepare specimens for mechanical performance tests.

Tensile modulus of elasticity, tensile stress at yield and tensile stress at break were determined by Zwick 2020 materials testing system according to ISO 527, on ISO tensile specimens, type 1A, 170 mm×10 mm×4 mm at a temperature (23±2)° C., relative humidity (50±10)%.

Notched impact strength was determined by CEAST Resit Impactor 6967.000, according to ISO 179/1 eA (Charpy) on tensile specimens ISO 527 type 1A which were cut off two ends, 80 mm×10 mm×4 mm at a temperature (23±2)° C., relative humidity (50±10)%.

Hardness (shore D) was determined by Time group shore D hardness tester TH210, according to ISO 868, on tensile specimens ISO 527 type 1A 170 mm×10 mm×4 mm at a temperature (23±2)° C., relative humidity (50±10)%.

The polymer composites in pellet form were further processed on an injection moulding machine Engel VC 650/200 (melt temperature 270° C.; mould temperature 50° C.) to prepare specimens for haze value test.

Haze value was determined at 23° C., by Spectrophotometer CM-3600d from KONICA MINOLTA according to ASTM D1003 (CIE C illuminant) on 3 mm thickness plate of size 55 mm×30 mm, and haze value was stated in percentage.

Ross flex test was determined by Lab Tech LAB-F2000 cold ross flexing tester, on ross flex specimens 150 mm×20 mm×2 mm, in bending degree 0°-60°-0° for 200,000 turns, at a temperature (23±2)° C., relative humidify (50±10)%.

The overall results are shown in Table 1.

TABLE 1

Recipe and performance

| | Recipe | | | | |
|---|---|---|---|---|---|
| | Reference 1 | Reference 2 | E1 | E2 | E3 |
| Polyamide 1 | 100% | — | 91% | 89% | 87% |
| Polyamide 2 | — | 100% | — | — | — |
| Lanxess CS7974 | — | — | — | — | — |
| CPIC ECS301HP | — | — | — | — | — |
| AGY 544 | — | — | 4% | 6% | 8% |
| Exxelor VA1803 | — | — | — | — | — |
| Paraloid EXL 2690 | — | — | 5% | 5% | 5% |
| Tensile modulus (MPa) | 1100 | 1400 | 1620 | 1890 | 2250 |
| Stress at yield (MPa) | 34 | 60 | 46.5 | 53 | 59 |
| Stress at break (MPa) | 63 | 60 | 33.9 | 36.1 | 55.6 |
| Notched impact strength (kJ/m$^2$) | 11 | 11 | 20.7 | 24 | 25 |
| Hardness (Shore D) | 71 | 81 | 72.9 | 72 | 73 |
| Haze value (%) | 40 | <2 | 55 | 62 | 64.8 |
| Ross flex (200,000 turns) | no break | <50,000 | no break | no break | no break |

Refractive index (RT) Reference: 1.520
Refractive index (RT) AGY 544: 1.521
Refractive index (RT) Paraloid EXL 2690: 1.514

| | Recipe | | | | | |
|---|---|---|---|---|---|---|
| | CE1 | CE2 | CE3 | CE4 | CE5 | CE6 |
| Polyamide 1 | 91% | 91% | 91% | 65% | — | — |
| Polyamide 2 | — | — | — | — | 92% | 87% |
| Lanxess C57974 | 4% | — | — | — | — | — |
| CPIC ECS301HP | — | 4% | — | — | — | — |
| AGY 544 | — | — | 4% | 30% | 8% | 8% |
| Exxelor VA1803 | 5% | 5% | 5% | — | — | — |
| Paraloid EXL 2690 | — | — | — | 5% | — | 5% |
| | Performance | | | | | |
| Tensile modulus (MPa) | 1480 | 1510 | 1590 | 6180 | 3010 | 2880 |
| Stress at yield (MPa) | 41.9 | 43.7 | 38.9 | 115 | 90.5 | 83.3 |
| Stress at break (MPa) | 36.1 | 37.9 | 40.4 | 114 | 86.5 | 79.9 |
| Notched impact strength (kJ/m$^2$) | 26.7 | 26.1 | 23.6 | 35 | 4.55 | 5.1 |
| Hardness (Shore D) | 70.9 | 70.9 | 70.2 | 78 | 82.5 | 81.3 |
| Haze value (%) | >95 | >95 | >95 | 83.6 | 43 | 43 |
| Ross flex (200,000 turns) | no break | no break | no break | <16,000 | <2,800 | <2,660 |

Compared to other combination of the glass fibres and the impact modifiers (CE1-4), the polymer composite with S glass fibre and the core-shell impact modifier (E1) shows a much less reduced haze value. Compared to the reference, E1 shows significantly improved tensile modulus and notched impact strength, while maintaining a high flexibility.

The invention claimed is:
1. A polymer composite comprising:
(a) 87-91 wt % of polyamide PA12,
(b) 4-8 wt % of an S glass fiber comprising 64-66% $SiO_2$, 24-25% $Al_2O_3$, 0-0.2% CaO, 9.5-10% MgO, 0-0.2% $Na_2O+K_2O$ and 0-0.1% $Fe_2O_3$, based on the total weight of the glass, and
(c) about 5 wt % of a core-shell impact modifier comprising about 80 wt % of a core which comprises butadiene and no styrene units and about 20 wt % of a shell comprising methyl methacrylate,
wherein the wt % of (a), (b) and (c) are based on the total weight of the polymer composite and
a difference in refractive indices between the PA 12 according to (a) and the S glass fiber according to (b) at room temperature is less than 0.01,
and/or
a difference in refractive indices between the PA 12 according to (a) and the core-shell modifier according to (c) at room temperature is less than 0.01,
measured according to DIN EN ISO 489:1999 by method A.

2. The polymer composite according to claim 1, wherein the S glass fiber does not comprise $B_2O_3$ and/or $TiO_2$.

3. The polymer composite according to claim 1, wherein said polyamide is transparent with a haze not greater than 60%, measured according to ASTM D1003 on injection molded test specimens of 3 mm in thickness.

4. The polymer composite according to claim 1, further comprising customary added substances with a total amount not greater than 10 wt % based on the total weight of the polymer composite.

5. The polymer composite according to claim 2, wherein the S glass fibre does not comprise further oxides.

6. The polymer composite according to claim 1, further comprising not greater than 10 wt % in total, based on the total weight of the polymer composite, of flame retardants, stabilizers, plasticizers, glass fibres, fillers, nanoparticles, antistats, dyes, pigments, mould-release agents, and/or flow assistants.

7. The polymer composite according to claim 1, wherein said semi-crystalline polyamide has an enthalpy of fusion of 4 to 25 J/g as measured by the DSC method to ISO 11357 in the second heating step with a heating rate of 10 K/min and integration of the melt peak.

8. A molding material consisting of the polymer composite according to claim 1.

9. A molding material, comprising:
   the polymer composite according to claim 1.

10. A molded article produced from the moulding material according to claim 9.

11. The molded article according to claim 10, suitable for electrical equipment, a sports item, optical equipment, a sanitary item, a hygiene item, household equipment, communications technology, automobile technology, energy technology, drive technology, mechanical engineering, and/or medical equipment.

\* \* \* \* \*